US012597347B2

(12) United States Patent
Kaneko et al.

(10) Patent No.: US 12,597,347 B2
(45) Date of Patent: Apr. 7, 2026

(54) ACTION SCHEDULE NOTIFICATION DEVICE FOR VEHICLE AND ACTION SCHEDULE NOTIFICATION METHOD FOR VEHICLE

(71) Applicant: TOYOTA JIDOSHA KABUSHIKI KAISHA, Aichi-ken (JP)

(72) Inventors: Tomohiko Kaneko, Yokohama (JP); Junichi Morimura, Sunto-gun (JP); Shun Maruyama, Numazu (JP); Ryoma Hiraike, Toyota (JP); Satoshi Omi, Ebina (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/671,828

(22) Filed: May 22, 2024

(65) Prior Publication Data

US 2024/0395143 A1 Nov. 28, 2024

(30) Foreign Application Priority Data

May 23, 2023 (JP) ................................ 2023-084576

(51) Int. Cl.
*G08G 1/09* (2006.01)
*B60Q 9/00* (2006.01)
*G08G 1/0967* (2006.01)
(52) U.S. Cl.
CPC ......... *G08G 1/096791* (2013.01); *B60Q 9/00* (2013.01); *B60Q 2800/10* (2022.05)

(58) Field of Classification Search
CPC ................ G08G 1/096791; B60Q 9/00; B60Q 2800/10; B60Q 1/507; B60Q 1/543
See application file for complete search history.

(56) References Cited

U.S. PATENT DOCUMENTS

| | | | | |
|---|---|---|---|---|
| 8,606,430 B2* | 12/2013 | Seder | ...................... | B60Q 1/50 701/2 |
| 10,261,513 B2* | 4/2019 | Reiley | .................... | B60Q 5/006 |
| 11,772,550 B2* | 10/2023 | Oya | ...................... | B60Q 1/525 340/463 |
| 12,030,500 B2* | 7/2024 | Kanoh | ............ | B60W 30/18163 |
| 2019/0043363 A1 | 2/2019 | Morimura et al. | | |
| 2021/0086768 A1 | 3/2021 | Komoguchi et al. | | |
| 2024/0116529 A1* | 4/2024 | Kume | ............... | B60W 60/0053 |
| 2024/0409112 A1* | 12/2024 | Fayad | ............ | B60W 30/18163 |

FOREIGN PATENT DOCUMENTS

| | | |
|---|---|---|
| JP | 2018108767 A | 7/2018 |
| JP | 2019-026201 A | 2/2019 |
| JP | 2019-051822 A | 4/2019 |
| JP | 2019209837 A | 12/2019 |

* cited by examiner

*Primary Examiner* — Toan N Pham
(74) *Attorney, Agent, or Firm* — HAUPTMAN HAM, LLP

(57) ABSTRACT

The processor 162 of ECU 160 is configured to determine an action schedule of the vehicle capable of autonomous driving and notify two or more consecutive action schedules to surrounding other vehicles, and is configured to perform at least one of notifying the two or more consecutive action schedules from the vehicle to the outside by display or voice or having the two or more consecutive action schedules notified by display or voice in the surrounding other vehicles.

5 Claims, 6 Drawing Sheets

ACTION SCHEDULE NOTIFICATION DEVICE FOR VEHICLE AND ACTION SCHEDULE NOTIFICATION METHOD FOR VEHICLE

RELATED APPLICATIONS

The present application claims priority of Japanese Patent Application No. 2023-084576 filed May 23, 2023, the disclosure of which is hereby incorporated by reference herein in its entirety.

FIELD

The present invention relates to an action schedule notification device for a vehicle and an action schedule notification method for a vehicle.

BACKGROUND

Conventionally, as described in JP-A-2019-051822, it is known that the intention of lane change is indicated to the surroundings by characters, projection light of arrows, sound, or the like. Further, as described in the above-mentioned patent document, it is known to express gratitude to a driver of a surrounding vehicle when the driver permits interruption or the like.

SUMMARY

Technical Problem

However, in the technique described in the above-mentioned patent document, the immediately following action content is only notified to the outside of the vehicle. Therefore, it is not possible to further recognize the next action of the vehicle from the surroundings. Therefore, when viewed from the surrounding traffic participants, the movement of the vehicle may be unexpected. Therefore, the risk of an accident or the like still remains.

In view of the above problems, an object of the present disclosure is to provide an action schedule notification device for a vehicle and an action schedule notification method for a vehicle capable of notifying a plurality of consecutive action schedules to the surroundings.

Solution to Problem

The gist of the present disclosure is as follows.

(1) An action schedule notification device for a vehicle comprising a processor, wherein the processor is configured to determine an action schedule of the vehicle capable of autonomous driving, notify two or more consecutive action schedules to surrounding other vehicles, and perform at least one of notifying the two or more consecutive action schedules from the vehicle to the outside by display or voice or having the two or more consecutive action schedules notified by display or voice in the surrounding other vehicles.

(2) The action schedule notification device according to (1) above, wherein the two or more continuous action schedule includes, when the vehicle merges into a road having a plurality of lanes, margin into the road and changing a lane from a lane after merging or running a lane after merging as it is.

(3) The action schedule notification device according to (1) above, wherein the two or more continuous action schedule includes changing a lane toward a lane connected to an exit of a road while the vehicle is traveling in a lane other than a lane connected to the exit of the road having a plurality of lanes and descending from the road at the exit.

(4) The action schedule notification device according to any one of (1) to (3) above, wherein the processor is configured to determine whether or not the vehicle is traveling in an area in which the manually driven vehicle is mixed, and when the vehicle is traveling in an area in which the manually driven vehicle is mixed, the processor is configured to notify the surrounding vehicle of two or more consecutive action schedules.

(5) An action schedule notification method of a vehicle comprises steps of determining an action schedule of the vehicle capable of autonomous driving, notifying two or more consecutive action schedules to surrounding other vehicles, wherein the step of notifying includes at least one of steps of notifying the two or more consecutive action schedules from the vehicle toward the outside by display or voice or having the two or more consecutive action schedules notified by display or voice in the surrounding other vehicles.

Advantageous Effects of Invention

According to the present disclosure, there is provided an action schedule notification device for a vehicle capable of notifying a plurality of consecutive action schedules to the surroundings, and an action schedule notification method for the vehicle.

DESCRIPTION OF EMBODIMENTS

Figure 1:
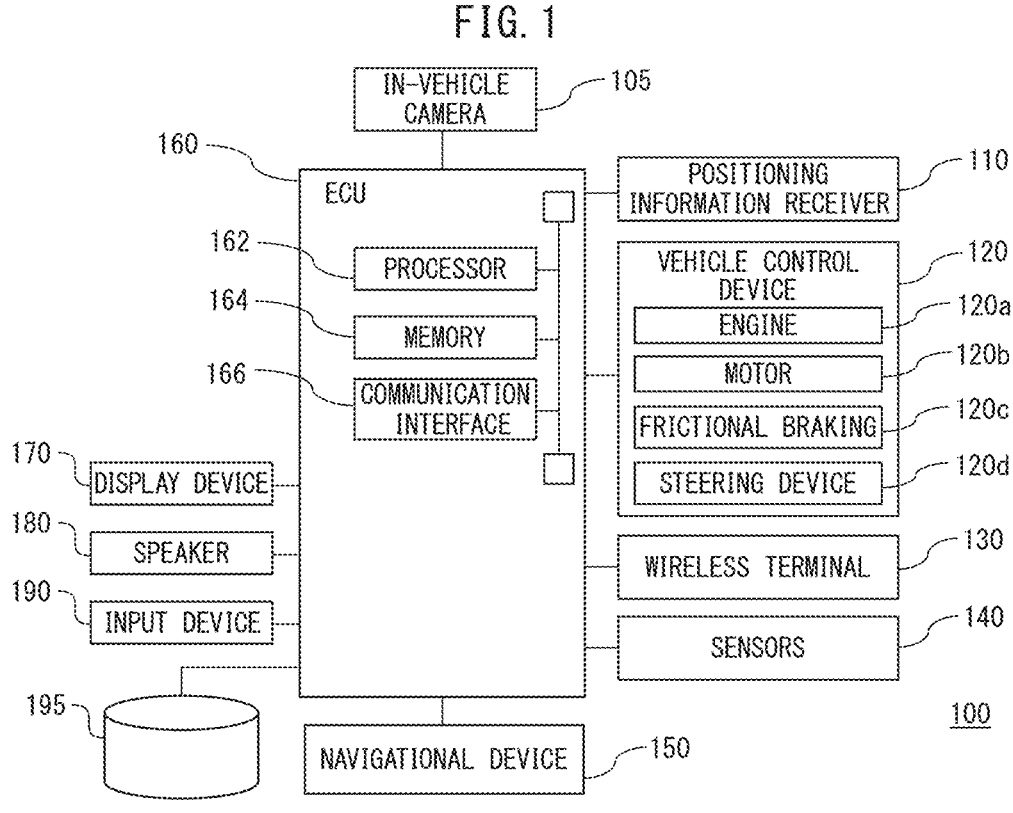
FIG. 1 is a schematic diagram showing a configuration of an action schedule notification system mounted on the vehicle.

Hereinafter, some embodiments of the present invention will be described with reference to the drawings. However, these descriptions are intended to be merely exemplary of the preferred embodiments of the present invention and are not intended to limit the present invention to such specific embodiments. In the following description, the same reference numerals are given to the same constituent elements.

FIG. 1 is a schematic diagram illustrating a configuration of an action schedule notification system mounted on a vehicle 100. The action schedule notification system is applied to, for example, a system that is capable of traveling (hands-off traveling) in a state in which the driver releases the steering. In the present embodiment, for example, it is assumed that the vehicle travels at a level 2 or a level 3 or more as determined by the American Society of Automotive Engineers (SAE). In the following description, such travel is also referred to as autonomous driving by a vehicle. In other words, in the present embodiment, the vehicle capable of autonomous driving is a vehicle capable of traveling at the level 2 or the level 3 or more. The vehicle capable of autonomous driving may be a vehicle capable of partial autonomous driving or a fully autonomous driving vehicle.

The motion schedule notification system includes an in-vehicle camera 105, a positioning information receiver 110, a vehicle control device 120, a wireless terminal 130, one or more sensors 140, a navigational device 150, a ECU (Electronic Control Unit) 160, a display device 170, a speaker 180, an input device 190, and a storage device 195. These are communicatively connected via an in-vehicle network compliant with standards such as Controller Area Network (CAN).

The in-vehicle camera 105 includes a two-dimensional detector such as a CCD or a C-MOS, and an imaging optical system. The in-vehicle camera 105 captures an image of the surroundings of the vehicle 100 and generates an image representing the surroundings of the vehicle 100. The surroundings of the vehicle 100 are, for example, the front, side, or rear of the vehicle.

The positioning information receiver 110 acquires positioning information indicating a current position and an attitude of the vehicle 100. For example, the positioning information receiver 110 may be a GPS (Global Positioning System) receiver.

The vehicle control device 120 is a variety of devices related to vehicle control. The vehicle control device 120 includes an engine 120a and a motor 120b as driving sources for driving the vehicle, a frictional braking 120c, a steering device 120d, a transmission (not shown), and the like.

The wireless terminal 130 performs inter-vehicle communication by inter-vehicle communication. In the inter-vehicle communication, for example, DSRC (Dedicated Short Range Communications) is used. Communication with other vehicles in the vicinity may be performed via an external server.

The one or more sensors 140 include sensors for monitoring the surroundings of the vehicles 100, e.g., Lidar (Light Detection and Ranging), Radar, etc.

The navigation device 150 obtains a route to be traveled from the current location of the vehicle 100 to the destination of travel according to a predetermined route search method such as the Dijkstra method.

ECU 160 includes a processor 162, memory 164, and a communication interface 166. The processor 162 includes one or more CPU and peripheral circuitry thereof. The processor 162 provides a predetermined function by executing a computer program excitably loaded in a work area of the memory 164. The memory 164 includes, for example, a volatile semiconductor memory and a non-volatile semiconductor memory. The communication interface 166 has interface circuitry for connecting ECU 160 to an in-vehicle network or to an external communication network.

The display device 170 includes, for example, a liquid crystal display (LCD). The display device 170 is provided in an exterior panel, a window, or the like outside the vehicle 100. The display device 170 displays an action schedule of the vehicle 100 when the vehicle 100 is driven by autonomous driving. The speaker 180 is provided outside the vehicle 100 similarly to the display device 170. The speaker 180 emits an action schedule to the outside of the vehicle by voice. Note that the display device 170 and the speaker 180 may constitute an integrated HMI device.

The input device 190 is a device to which operation information by a driver is input. The input device 190 includes a button, a touch sensor, and the like. In the input device 190, a setting for setting the driving of the vehicle 100 to the autonomous driving mode or the like is input by the operation of the driver.

The storage device 195 includes, for example, a hard disk device or an optical recording medium, and an access device thereof. The storage device 195 stores various kinds of information such as a high-definition map.

Figure 2:
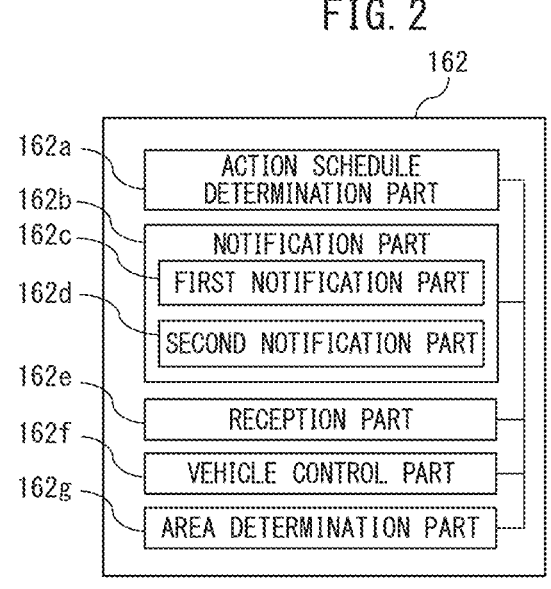
FIG. 2 is a schematic diagram showing a functional block of a processor of ECU provided in the vehicle.

FIG. 2 is a schematic diagram illustrating functional blocks of the processor 162 of ECU 160 provided in the vehicles 100. The processor 162 is an aspect of an action schedule notification device for a vehicle according to the present disclosure. The processor 162 includes an action schedule determination part 162a, a notification part 162b, a reception part 162c, a vehicle control part 162f, and an area determination part 162g. The notification part 162b has at least one of a first notification part 162c and a second notification part 162d. These parts included in the processor 162 are, for example, functional modules realized by a computer program. The computer program runs on processor 162. That is, each of these parts included in the processor 162 includes a processor 162 and a program (software) for causing the processor to function. The functional blocks of the processor 162 illustrated in FIG. 2 may be provided in a server or the like on the cloud. Then, the processing of the functional block may be performed by a server on the cloud, and a command corresponding to the processing may be transmitted from the server to the vehicle 100, and the processing based on the command received by the vehicle 100 may be performed.

The action schedule determination part 162a determines the action schedule of the vehicle 100 during the vehicle driving in the autonomous driving mode. Specifically, the action schedule determination part applies the position information indicating the current position of the vehicle 100 and the scheduled traveling route to the destination to the high-precision map. Then, the action schedule determination part 162a determines an action schedule at a merging point, an intersection, or the like existing on the scheduled traveling route obtained from the high-precision map.

Figure 3:
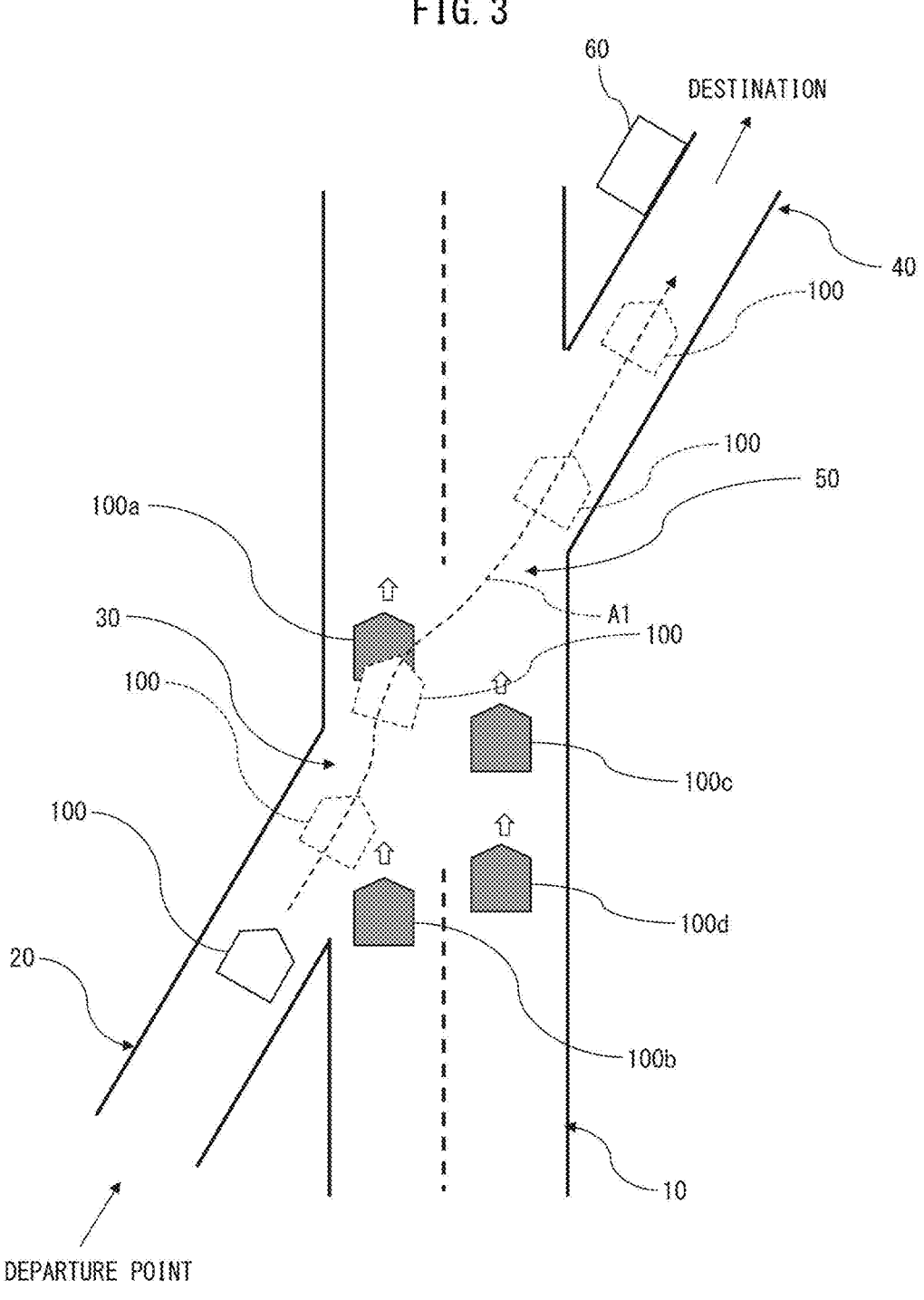
FIG. 3 is a schematic diagram for explaining a state in which the vehicle travels according to the action schedule when the vehicle travels toward the destination from the starting point, in the merging portion and the branching portion passing in the middle.

FIG. 3 is a schematic diagram for explaining a state in which the vehicle 100 travels in accordance with an action schedule. FIG. 3 shows a merging portion and a branching portion through which the vehicle 100 passes in the middle when the vehicle 100 travels from the departure point toward the destination.

In the example illustrated in FIG. 3, the road 20 merges from the left side to the left lane of the road 10 of the one-side two lanes in the merging part 30. Further, at the branching portion 50, the road 40 branches from the right lane of the road 10 of the two lanes on one side to the right side. In FIG. 3, the destination of the vehicle 100 is a point ahead of the road 40. The vehicle 100 travels by autonomous driving from a departure point located on the front side of the road 20 toward a destination ahead of the road 40. In addition, FIG. 3 illustrates a state in which the other vehicles 100a to 100d that are manually driven by the drivers travel on the roadway 10. The other vehicles 100a to 100d are the vehicles that are set to the manual driving mode and are driven manually by the drivers. The other vehicles 100a to 100d may be a conventional vehicle that is driven only by manual driving.

The high-precision map is stored in the storage device 195. The high-precision map includes information indicating detailed positional relationships such as the roads 10, 20, and 40, the merging part 30, the branching part 50, and the dividing lines that divide the left and right lanes, as shown in FIG. 3.

The vehicle 100 travels according to three consecutive action schedules. The three consecutive action schedules are that the vehicle 100 joins the road 10 from the road 20, changes the lane from the left lane of the road 10 to the right lane, and enters the road 40 from the road 10. The action schedule determination part 162a refers to the high-precision maps stored in the storage device 195 and determines such an action schedule.

When the action schedule determined by the action schedule determination part 162a includes two or more consecutive action schedules, the notification part 162b notifies the surrounding other vehicles of two or more consecutive action schedules. Here, the consecutive action schedule is an action schedule continuously performed by the vehicle 100 within a predetermined time. The predetermined time period is, for example, 20 seconds. Alternatively, the continuous action schedule refers to an action schedule in which the vehicle 100 continuously performs while traveling a predetermined distance. The predetermined distance is, for example, a 100 m.

Figures 4, 5, 6:
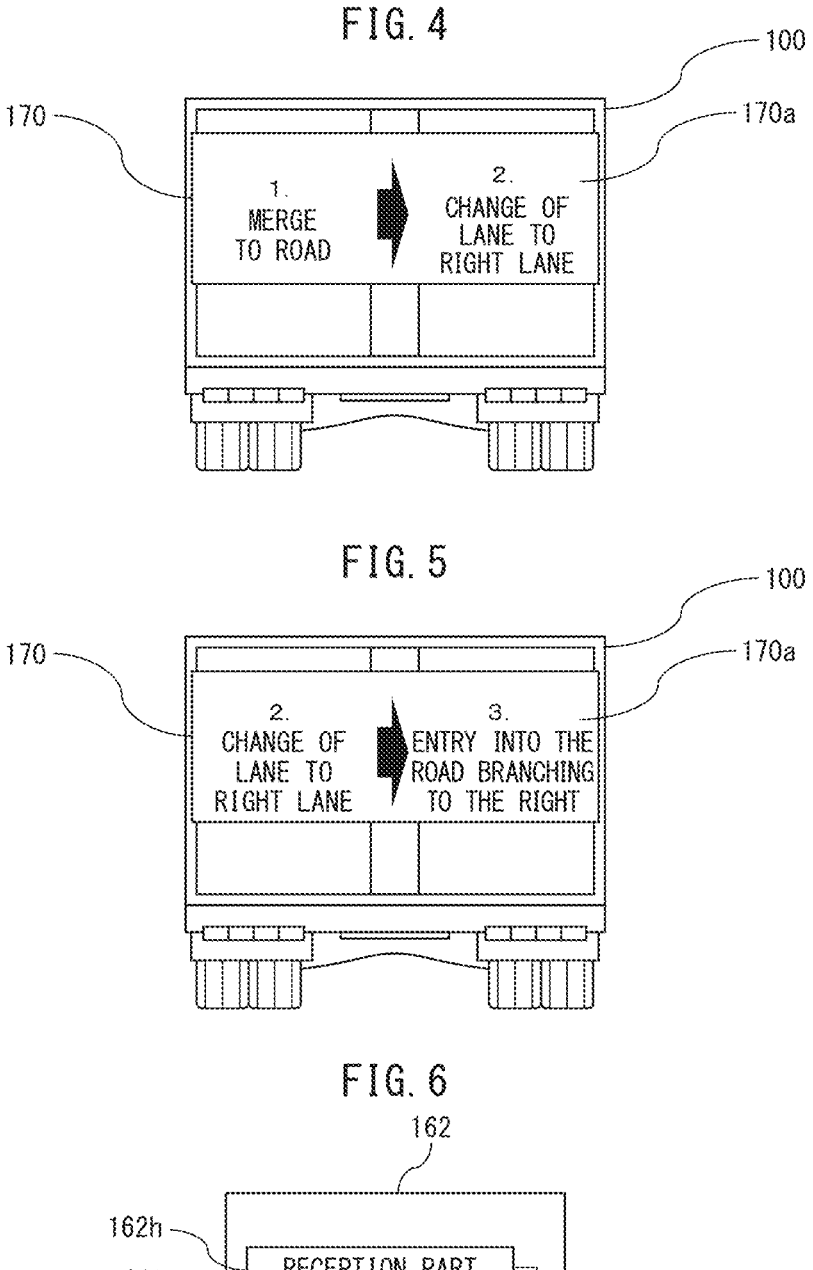
FIG. 4 is a schematic diagram showing an example in which the action schedule is displayed on the display screen of the display device when the vehicle is operated along the direction of arrow A1 shown in FIG. 3.
FIG. 5 is a schematic diagram showing an example in which the action schedule is displayed on the display screen of the display device when the vehicle is operated along the direction of arrow A1 shown in FIG. 3.
FIG. 6 is a functional block of a processor provided in the action schedule notification system of other vehicles.

The first notification part 162c notifies two or more consecutive action schedules from the vehicles 100 to the outside by display or voice. Specifically, the first notification part 162c performs a process for displaying two or more consecutive action schedules on the display device 170 provided outside the vehicle 100. Alternatively, the first notification part 162c performs a process for causing two or more consecutive action schedules to be outputted by sound from a speaker 180 provided outside the vehicle 100. FIG. 4 and FIG. 5 show a situation in which the vehicles 100 are driven along the direction of arrow A1 shown in FIG. 3 in accordance with the three action schedules described above. FIG. 4 and FIG. 5 are schematic diagrams illustrating an example in which an action schedule is displayed on a display screen 170a of the display device 170.

FIG. 4 and FIG. 5 illustrate a case where the vehicle 100 is a truck. As illustrated, the display device 170 is provided at a rear portion (rear surface) of the vehicle 100. FIG. 4 shows a situation in which two action schedules are displayed on the screen 170a of the display device 170 when the vehicle 100 merges from the road 20 to the left lane of the road 10. The displaying is performed by the first notification part 162c process. The two action schedules are "1. Merge to Road 10" which is the latest action schedule, and "2. Change of lane from left lane to right lane of Road 10" which is the next action schedule. In addition, by the first notification part 162c process, these action schedules are outputted from the speaker 180 by sound.

The drivers of the other vehicles 100a to 100d that travel around the vehicle 100 by manual driving visually recognize the display of the display device 170. Alternatively, the drivers from the other vehicles 100a to 100d listen to the sound from the speaker 180. Therefore, the drivers of the other vehicles 100a to 100d can recognize in advance that the vehicle 100 joins the road 10 from the road 20 and changes the lane from the left lane of the road 10 to the right lane. Therefore, the drivers of the other vehicles 100a to 100d can endeavor to secure safety by keeping the distance to the vehicle 100 when the vehicle 100 joins and changes lanes.

The first notification part 162c can dynamically change the display on the display device 170 as the vehicles 100 travel. FIG. 5 is a schematic diagram illustrating an action schedule displayed when the vehicle 100 merges from the road 20 to the road 10 and then changes the lane from the left lane to the right lane of the road 10. After the vehicles 100 merge from the road 20 to the road 10, the action schedule indicating "2. lane change from the left lane to the right lane of the road 10" displayed on the right side of the display screen 170a in FIG. 4 is shifted to the left side of the screen. Then, on the right side of the screen, the next action schedule after the lane change, "3. Entry into the road 40 branching to the right" is newly displayed. Similarly, these action schedules are output by voice from the speaker 180. Thus, the driver of the other vehicles 100a to 100d traveling around the vehicle 100 can recognize in advance that the vehicle 100 changes the lane from the left lane of the road 10 to the right lane and enters the road 40 branching from the road 10 to the right by visually recognizing the display of the display device 170 or listening to the sound from the speaker 180. Therefore, the driver can endeavor to secure safety by maintaining a distance from the vehicle 100 or the like.

Similarly, when the vehicle 100 enters the store 60 on the left side of the road 40 after entering the road 40, the action schedule indicating "3. Entry into the road 40 branched to the right" moves to the left side of the screen. Then, on the right side of the screen, "4. Enter the store on the left side", which is the next action schedule after the vehicle 100 enters the road 40, is newly displayed. Accordingly, the drivers of the other vehicles 100a to 100d traveling around the vehicle 100 can recognize in advance that the vehicle 100 enters the road 40 and enters the store 60.

In FIG. 3, after the vehicle 100 merges from the road 20 to the left lane of the road 10, the left lane may be moved straight without changing the lane. In this case, an action schedule in which the vehicle 100 travels straight along the left lane of the road 10 may be displayed on the right side of the display-screen 170a of FIG. 4. As described above, the two or more consecutive action schedules may include, in a case where the vehicle 100 merges with the road 10 having a plurality of lanes, merging of the vehicle 100 with the road 10, further changing the lane from the lane after merging, or running the lane after merging as it is.

The two action schedules may be alternately displayed on the display screen 170a at predetermined time-intervals, for example. When the two action schedules are not consecutive, only the latest action schedule may be displayed on the display screen 170a.

The reception part 162e performs a process of receiving, via the wireless terminal 130, position information, identification information, vehicle information, and the like of the other vehicles 100a to 100d in the vicinity of the vehicle 100. The identification information of the other vehicles 100a to 100d may be a vehicle number or the like. Here, the vehicle information includes information indicating in which of the autonomous driving mode and the manual driving mode the other vehicles 100a to 100d are driven. In addition, in the case of a vehicle in which the other vehicle is driven only by manual driving, the vehicle information may include information indicating the fact.

When the vehicle 100 is set to the autonomous driving mode, the vehicle control part 162f controls the vehicle control device 120 in accordance with the scheduled traveling route and the scheduled action. Then, the vehicle control part 162f drives the vehicle 100 to the destination. At this time, the vehicle control part 162f drives the vehicle 100 by referring to images representing the surroundings of the vehicle 100 or the output of the sensor 140 as appropriate.

The area determination part 162g determines whether or not the vehicle 100 is traveling in an area where vehicles that are manually driven are mixed. For example, based on the location information of other vehicles received by the reception part 162e and vehicle information, the area determination part 162g determines that the vehicle 100 is running in an area with a mixture of manually driven vehicles when the ratio of manually driven vehicles among other vehicles that are running within a specified area (e.g., within the radius 50 m) is more than a specified percentage (e.g., more than 50%). When the vehicle 100 is traveling in an area where vehicles driven manually are mixed, the notification part 162b may notify the surrounding vehicle of two or more consecutive action schedules.

In addition, the second notification part 162d has two or more consecutive action schedules notified in the surrounding other vehicles 100a to 100d by display or voice. Specifically, the second the notification part 162d performs a process for transmitting two or more consecutive action schedules to the other vehicles 100a to 100d. This processing is performed in order to display two or more consecutive action schedules on a display device provided in a vehicle of another surrounding vehicle. Alternatively, this process is performed in order to allow two or more consecutive action schedules to be outputted by sound from a speaker provided in the vehicle of the other vehicles 100a to 100d. In addition to the action schedule, the second notification part 162d transmits the identification information of the vehicle 100, the position information of the vehicle 100, and the like to the other vehicles 100a to 100d. The identification information of the vehicle 100 may be a number of the vehicle 100 or the like.

The action schedule notification system of the other vehicles 100a to 100d is basically configured in the same manner as in FIG. 1, but the display device 170 and the speaker 180 are provided inside the vehicle. The display device 170 and the speaker 180 display the action schedule of the vehicle 100 toward the driver, and also output the action schedule by voice.

FIG. 6 is a schematic diagram illustrating functional blocks of the processor 162 provided in the action schedule notification system of the other vehicles 100a to 100d. This function block is for receiving an action schedule transmitted from the vehicle 100, displaying the action schedule on the display device 170 in the vehicle, and outputting sound from the speaker 180 in the vehicle.

The reception part 162h of the processor 162 of the other vehicles 100a to 100d performs a process for receiving the action schedule, the identification information, the position information, and the like of the vehicle 100. These are transmitted from the vehicle 100 and received via the wireless terminal 130. Further, the reception part 162h performs a process for receiving identification information, position information, and the like of another vehicle other than the host vehicle. For example, the servers on the cloud may recognize and manage the position information of the vehicle 100 and the other vehicles 100a to 100d based on the identification information. Here, the reception part 162h may receive the information from the servers.

When two or more consecutive action schedules are included in the action schedule received from the vehicle 100, a notification part 162i of the other vehicles 100a to 100d performs a process for displaying two or more consecutive action schedules on the display device 170 provided in the own vehicle, or a process for outputting two or more consecutive action schedules by sound from a speaker provided in the own vehicle. The notification part 162i may dynamically change the display of the received action schedule or the audio output as the vehicles 100 proceed. Thus, in the other vehicles 100a to 100d, the action schedule of the vehicle 100 is displayed on the display device 170 in the same manner as in FIGS. 4 and 5. In addition, in the other vehicles 100a to 100d, the same sound is outputted from the speaker 180.

Figure 7:
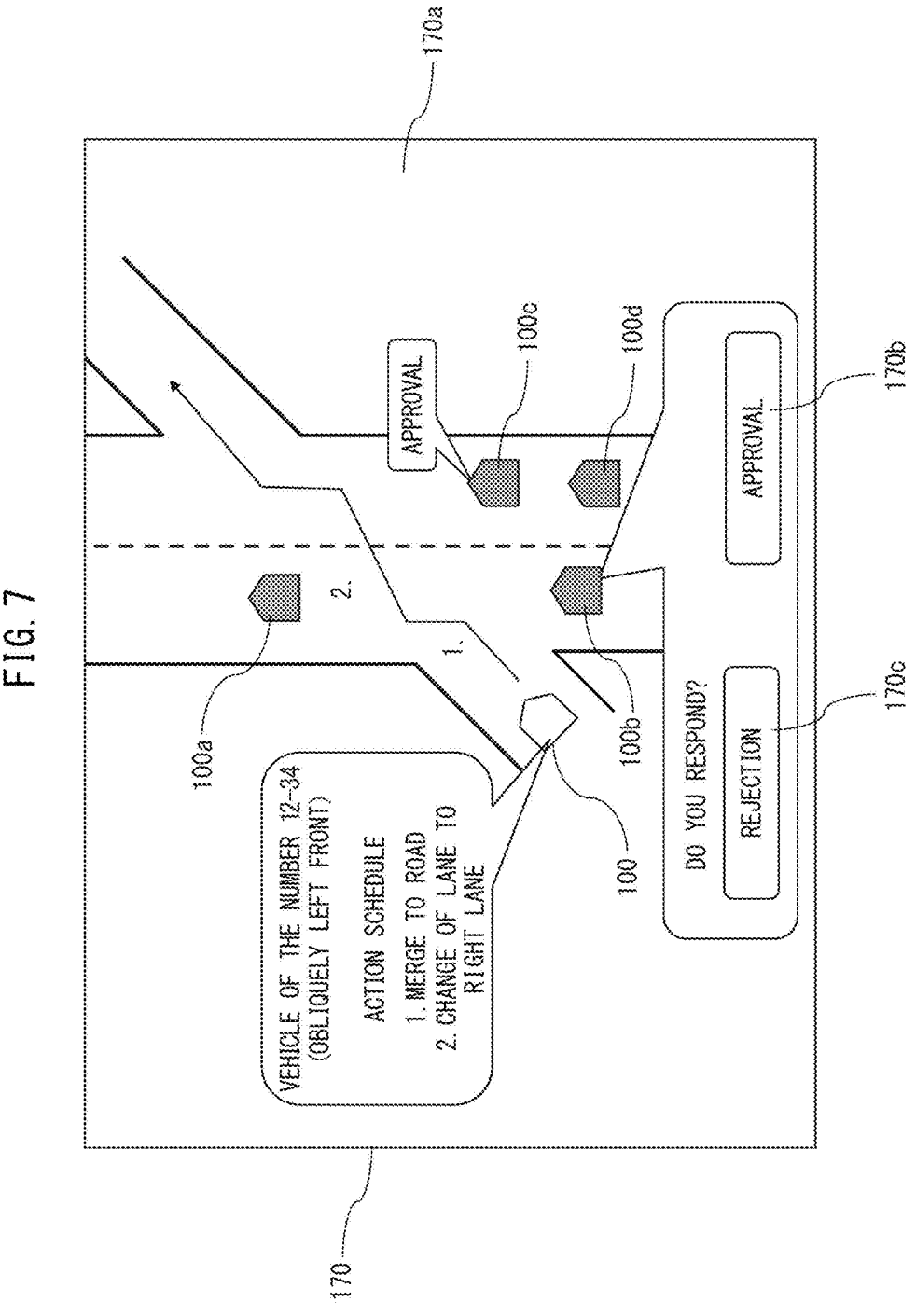
FIG. 7 is a schematic diagram showing a state of being displayed action schedule of the vehicle on the display screen of the display device of another vehicle.

FIG. 7 is a schematic diagram showing a state in which the action schedule of the vehicle 100 is displayed on the display screen 170a of the display device 170 of the other vehicle 100b in the other vehicles 100a to 100d. The display of the action schedule of the vehicle 100 illustrated in FIG. 7 corresponds to the display illustrated in FIG. 4. As shown in FIG. 7, when the vehicle 100 merges from the road 20 to the left lane of the road 10, two action schedules are displayed, namely "1. merging to the road 10" which is the most recent action schedule of the vehicle 100, and "2. lane change from the left lane of the road 10 to the right lane" which is the next action schedule.

In the embodiment illustrated in FIG. 7, the real-time positions of the vehicle 100 and the other vehicles 100a to 100d are displayed by being fitted to high-precision maps together with the action schedule of the vehicle 100. An arrow indicating an action schedule of the vehicle 100 is displayed. With such a display, the drivers of the other vehicle 100b can visually recognize the action schedule of the vehicle 100, the shapes of the roads, and the positions of the vehicle 100, the own vehicle, and the other vehicles 100a, 100c, and 100d.

Further, the notification part 162i performs a process for displaying the identification information (the number ab-cd of the vehicle) of the vehicle 100 that has transmitted the action schedule on the display device 170 inside the vehicle. Alternatively, the notification part 162i performs a process for displaying the relative position "obliquely left front" of the vehicle 100 with respect to the position of the host vehicle on the display device 170 inside the vehicle Based on the identity or relative position of the vehicle 100, the drivers of the other vehicle 100b can find the vehicle 100 around the own vehicle. Then, based on the display shown in FIG. 7, the driver can recognize in advance that the found vehicle 100 merges with the road on which the host vehicle travels, and changes the lane from the left lane to the right lane after the merging.

FIG. 7 illustrates an example in which a touch sensor that is the input device 190 is integrated with the display device 170 to form a touch panel. The drivers of the other vehicle 100b operate the approval button 170b and the rejection button 170c including the touch sensor. Accordingly, the drivers of the other vehicle 100b can notify the intention of approving or rejecting the action schedule of the vehicle 100. The transmitting part 162j of the processor 162 of the other vehicle 100b transmits, to the vehicle 100, a message indicating that the action schedule of the vehicle 100 is to be approved when the driver presses the approval button 170b. The transmission is performed via the wireless terminal 130. When the driver presses the reject button 170c, the transmitter 162*j* transmits a message to the vehicle 100 to reject the scheduled action of the vehicle 100.

In this case, the reception part 162*e* of the processor 162 of the vehicle 100 performs a process for receiving the fact that the action schedule of the vehicle 100 transmitted from the other vehicle 100*b* is approved or rejected. Upon receiving the fact that the action schedule is approved, the vehicle control part 162*f* controls the vehicle control device 120 according to the action schedule determined by the action schedule determination part 162*a*. On the other hand, when the action schedule is rejected, the vehicle control part 162*f* corrects the action schedule 30) determined by the action schedule determination part 162*a*. For example, when the vehicle 100 merges from the road 20 to the road 10, the vehicle control part 162*f* temporarily decelerates the vehicle 100 to advance the other vehicle 100*b* that has transmitted the refusal of the action schedule, and then merges with the road 10. In FIG. 7, it is displayed that the drivers of the other vehicle 100*c* have approved the action schedule of the vehicle 100.

Incidentally, the second notification part 162*d* may perform a process for transmitting two or more consecutive action schedule to the mobile terminal, for displaying two or more consecutive action schedule on the mobile terminal owned by the surrounding people, also for outputting sound from the speaker of the mobile terminal. The surrounding person may be, for example, a passenger other than the driver of the other vehicles 100*a* to 100*d*, a pedestrian, a bicycle driver, or the like.

Figure 8:
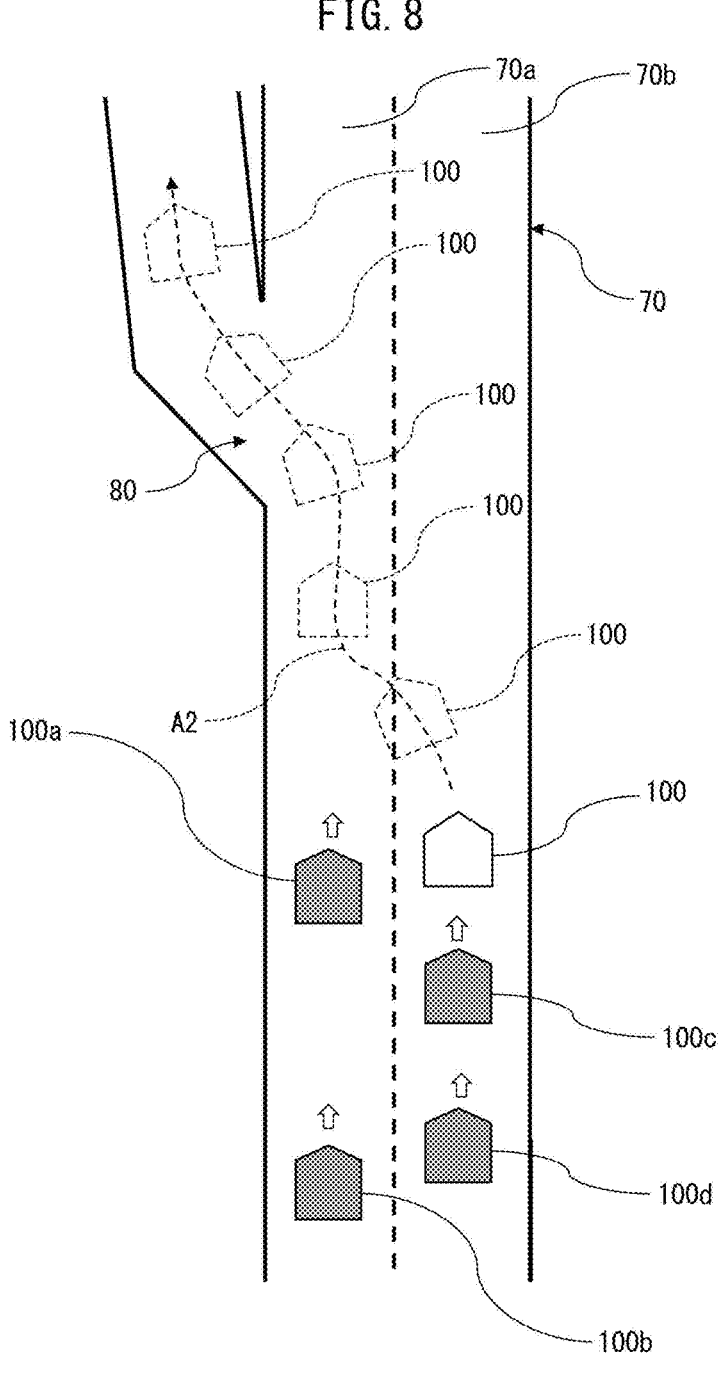
FIG. 8 is a diagram showing another action schedule of the vehicle, a schematic diagram for explaining a state in which the vehicle descends at the exit of the expressway when the vehicle is traveling on the expressway of one side two lanes.

FIG. 8 is a diagram illustrating another action schedule of the vehicle 100. FIG. 8 is a schematic diagram for explaining a state in which the vehicle 100 descends at the exit 80 of the expressway 70 when the vehicle 100 is traveling on the expressway 70 of two lanes on one side. The exit 80 of the expressway 70 is connected to the left lane 70*a*, and the vehicle 100 travels in the right lane 70*b*. The right lane 70*b* is not a lane 70*a* leading to the exit 80. Vehicle 100 travels along the dashed arrow A2 and travels down highway 70 at exit 80. Here, the two or more consecutive action schedules include changing the lane toward the lane 70*a* connected to the exit 80 and descending from the expressway 70 at the exit 80 while the vehicle 100 is traveling in a lane 70*b* other than the lane 70*a* connected to the exit 80 of the road 70 on the expressway 70 having a plurality of lanes.

Therefore, the display device 170 provided outside the vehicle 100 displays two action schedules of "1. lane change from the right lane 70*b* of the road 70 to the left lane 70*a*", which is the most recent action schedule, and "2. descend the expressway 70 at the exit 80", which is the subsequent action schedule, by the first notification part 162*c* process. The second action schedule preferably includes information specifying the exit 80 (for example, the name of the exit 80 (interchange). The information specifying the exit 80 may be, for example, the name of the exit 80 (interchange). In addition, the first notification part 162*c* may cause a picture to be displayed indicating that it is going down the highway 70 at the exit 80.

In addition to the examples illustrated in FIGS. 3 and 8, various types of consecutive action schedules of two or more of the vehicles 100 may be assumed. For example, the vehicle 100 may exit the parking lot of the store on a road of two lanes on one side. In addition, the vehicle 100 may exit a road of two lanes on one side on a T-shaped road. In addition, lane change may be performed after the vehicle 100 joins the road. In this case, the two or more consecutive action schedules are to exit the left lane of the road of the two lanes on one side and to change the lane from the left lane to the right lane. In addition, the notification part 162*b* may notify the surrounding vehicle of the gratitude (for example, "I am sorry") when notifying the 30 surrounding vehicle of the action schedule.

Further, the notification part 162*b* may notify the surrounding vehicles that the notified operation schedule is to be stopped when the action related to the action schedule becomes unnecessary even when the action schedule has been notified. The case where the operation related to the action schedule becomes unnecessary may be a case where a trouble occurs in merging, lane change, or the like due to a situation around the vehicle 100, or a case where a destination or a path is changed.

Figure 9:
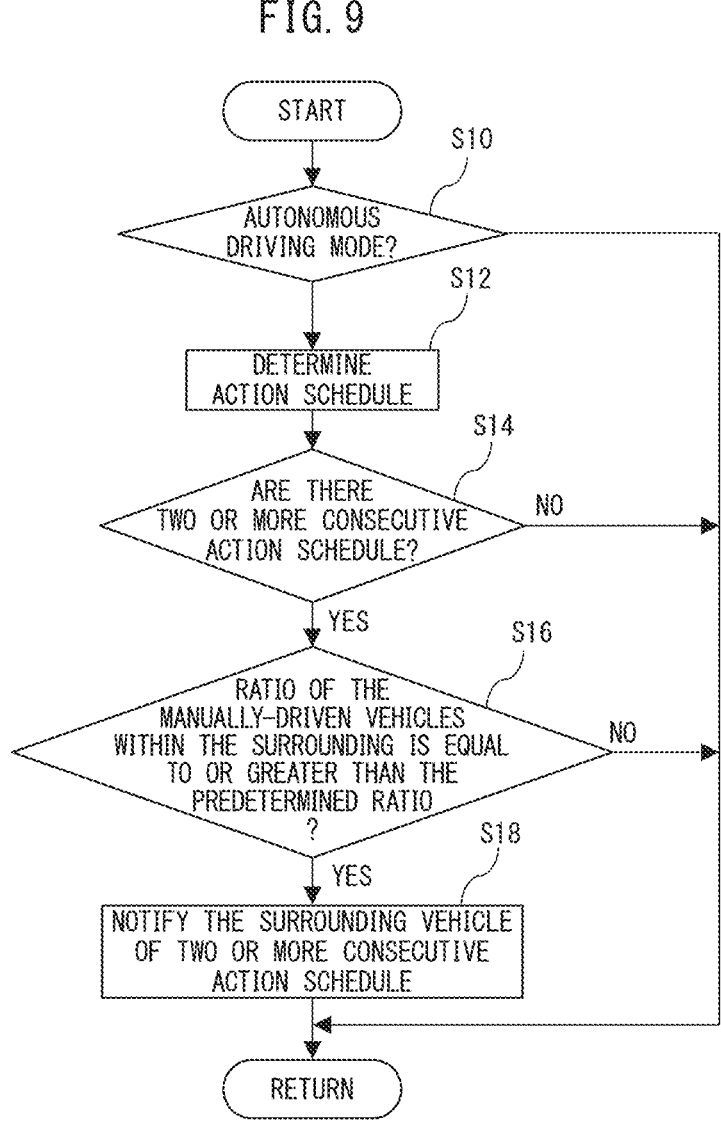
FIG. 9 is a flow chart showing a process performed by Processor of ECU for each predetermined control period.

Next, a process performed by the processor 162 in ECU 160 of the vehicles 100 will be described based on the flow chart of FIG. 9. FIG. 9 is a flow chart showing a process performed by the processor 162 of ECU 160 for each predetermined control cycle.

First, it is determined whether or not the vehicle 100 is set to the autonomous driving mode (S10). When the autonomous driving mode is set, the action schedule determination part 162*a* determines the action schedule of the vehicle 100 during the vehicle driving in the autonomous driving mode (S12). On the other hand, when the automatic operation mode is not set, the processing in this control cycle ends.

Next, it is determined whether or not there are two or more consecutive action schedules (S14). When there are two or more consecutive action schedules, the area determination part 162*g* determines whether or not the ratio of the manually-driven vehicles within the surrounding predetermined range is equal to or greater than the predetermined ratio (S16).

When the ratio of the manually-driven vehicle within the predetermined area of the surroundings is equal to or greater than the predetermined ratio (YES in S16), the notification part 162*b* notifies the surrounding vehicle of two or more consecutive action schedules (S18). The process of step S18 includes at least one of the following first step and second step. In the first step, the first notification part 162*c* displays or audibly notifies two or more consecutive action schedules from the own vehicle to the outside. In the second step, the second notification part 162*d* causes two or more consecutive action schedules to be displayed or audibly notified in the vehicle of the surrounding other vehicle. On the other hand, if there are no two or more consecutive action schedules in the step S14, the process in this control cycle ends. Alternatively, if the ratio of the manually-driven vehicles in the surrounding predetermined area is less than the predetermined ratio in S16 of steps, the process in the control cycle ends.

As described above, according to the present embodiment, two or more consecutive action schedules of the vehicle 100 are notified to the surrounding vehicle. Therefore, the drivers of the surrounding other vehicles 100*a* to 100*d* can recognize two or more consecutive action schedules in advance. Then, the driver can maintain a distance from the vehicle 100 and strive to secure safety.

The invention claimed is:

1. An action schedule notification device for a vehicle comprising a processor, wherein the processor is configured to:

determine an action schedule of the vehicle of autonomous driving, and notify two or more consecutive action schedules to surrounding other vehicles, by transmitting the two or more consecutive action schedules to surrounding other vehicles in order to display the two or more consecutive action schedules on a display device provided in the surrounding other vehicles or in order to output the two or more consecutive action schedules by sound from a speaker provided in the surrounding other vehicles.

2. The action schedule notification device according to claim 1, wherein the two or more continuous action schedule includes, when the vehicle merges into a road having a plurality of lanes, merging into the road and changing a lane from a lane after merging or running a lane after merging as it is.

3. The action schedule notification device according to claim 1, wherein the two or more continuous action schedule includes changing a lane toward a lane connected to an exit of a road while the vehicle is traveling in a lane other than a lane connected to the exit of the road having a plurality of lanes and descending from the road at the exit.

4. The action schedule notification device according to claim 1, wherein the processor is configured to determine whether or not the vehicle is traveling in an area in which a manually driven vehicle is mixed, and when the vehicle is traveling in an area in which the manually driven vehicle is mixed, the processor is configured to notify the surrounding vehicle of two or more consecutive action schedules.

5. An action schedule notification method of a vehicle comprises steps of:

determining an action schedule of the vehicle capable of autonomous driving, and notifying two or more consecutive action schedules to surrounding other vehicles, wherein the step of notifying includes a step of transmitting the two or more consecutive action schedules to surrounding other vehicles in order to display the two or more consecutive action schedules on a display device provided in the surrounding other vehicles or in order to output the two or more consecutive action schedules by sound from a speaker provided in the surrounding other vehicles.

* * * * *